Jan. 15, 1957 — D. A. REILLY — 2,777,727
VEHICLE CONVERSION UNIT
Filed Dec. 16, 1954 — 2 Sheets-Sheet 1
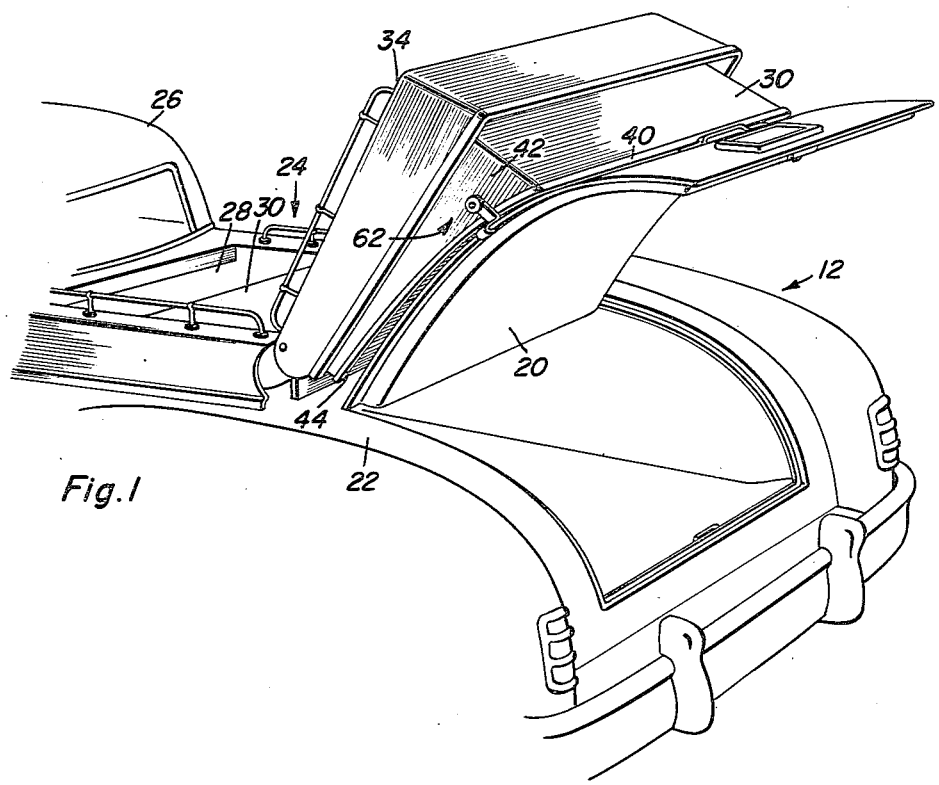
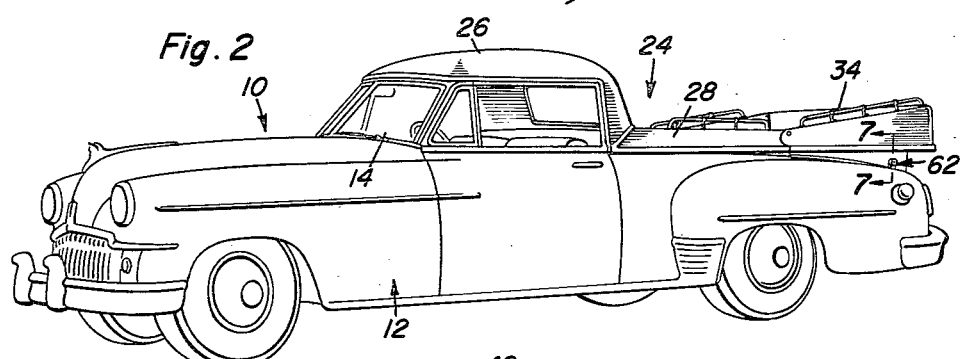
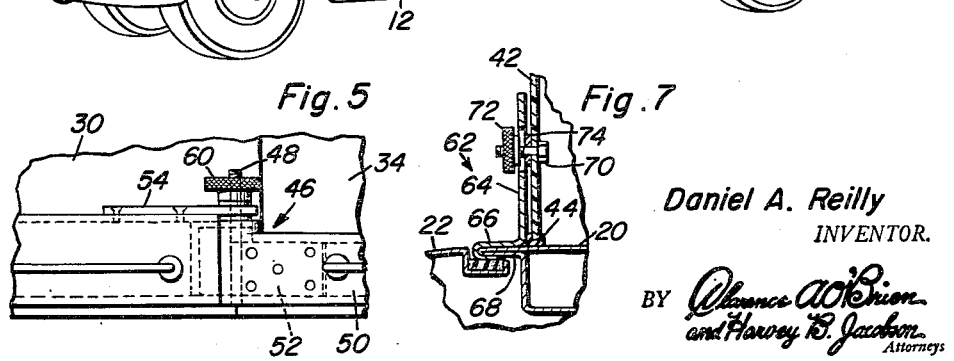
Daniel A. Reilly
INVENTOR.

Jan. 15, 1957   D. A. REILLY   2,777,727
VEHICLE CONVERSION UNIT
Filed Dec. 16, 1954   2 Sheets-Sheet 2
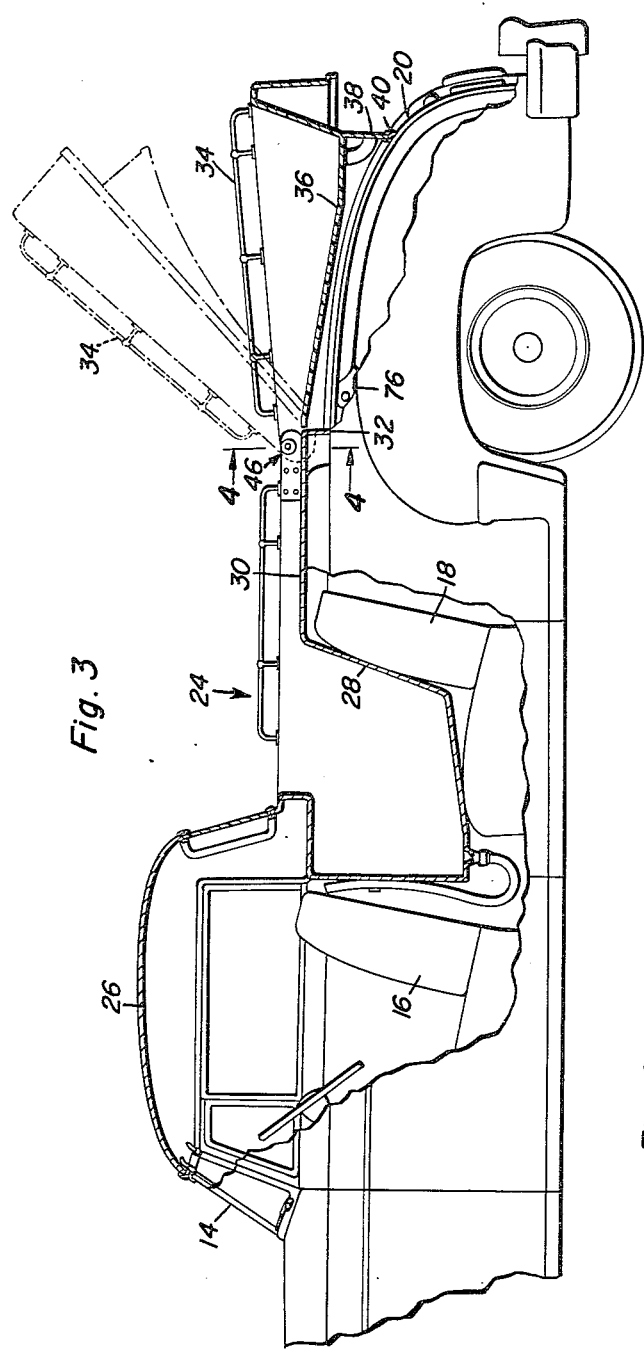
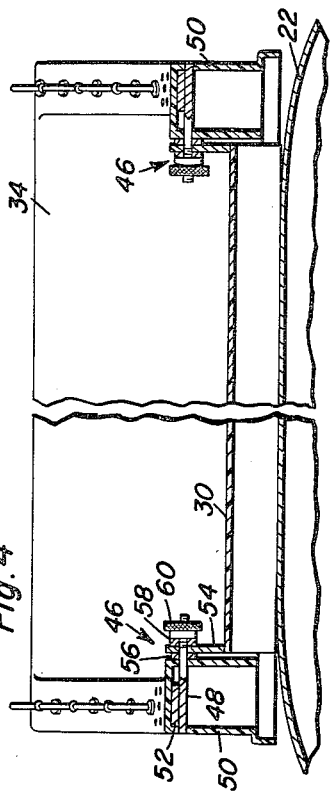
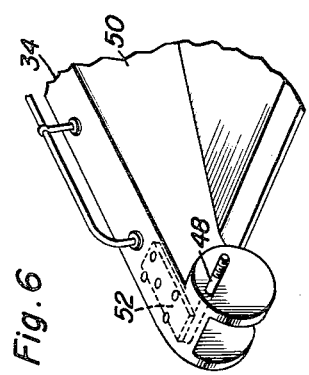
Daniel A. Reilly
INVENTOR.

United States Patent Office 2,777,727
Patented Jan. 15, 1957

2,777,727

VEHICLE CONVERSION UNIT

Daniel A. Reilly, Belmar, N. J.

Application December 16, 1954, Serial No. 475,687

5 Claims. (Cl. 296—21)

This invention relates in general to new and useful improvements in vehicle body construction, and more particularly to an improved vehicle convertible body unit.

This invention is an improvement on my vehicle conversion unit of my pending application, Serial No. 384,922, filed October 8, 1953.

Although my original vehicle conversion unit and other similar vehicle conversion units have proved successful from the standpoint that they may be utilized to convert a convertible type passenger vehicle into a flower carrier for funeral purposes, one of the major drawbacks of such units is that due to the fact that the rear or tonneau portion of the conversion unit overlies the trunk lid of the vehicle, it prevents accessibility to the trunk of such vehicle.

It is therefore the primary object of this invention to provide an improved vehicle conversion unit which is so constructed whereby the tonneau portion thereof may be pivoted with respect to the remainder thereof so that the tonneau portion and an associated trunk lid may be pivoted upwardly to permit accessibility to the trunk of the vehicle on which the vehicle conversion unit is mounted.

Another object of this invention is to provide an improved connection between a tonneau portion of a vehicle conversion unit and a trunk lid of a convertible type passenger vehicle, the connection permitting the hinging of both the tonneau portion and the trunk lid.

A further object of this invention is to provide an improved vehicle conversion unit in the form of an upper body which is formed as a unit and which may be dropped down on a vehicle of the convertible passenger type, the vehicle conversion unit including a tonneau portion pivotally connected to the remainder thereof for pivoting about a transverse axis, the pivotal connection between the tonneau portion and the remainder of the body being lockable to form a rigid unit.

These together with other objects and advantages which will become subsequently apparent reside in the details of construction and operation as more fully hereinafter described and claimed, reference being had to the accompanying drawings forming a part hereof, wherein like numerals refer to like parts throughout the various views, and in which:

Figure 1 is a rear perspective view of a convertible type passenger vehicle having mounted thereon the vehicle conversion unit which is the subject of this invention, the trunk lid of the passenger vehicle being in an open position and the tonneau portion of the conversion unit being pivoted upwardly with the trunk lid;

Figure 2 is a front quarter perspective view of the vehicle conversion unit showing the same mounted on a convertible type passenger vehicle;

Figure 3 is an enlarged fragmentary side elevational view of the vehicle of Figure 2 with portions thereof and the vehicle conversion unit being shown in section in order to clearly illustrate the relationship between the vehicle conversion unit and the vehicle, the vehicle conversion unit having the tonneau portion thereof shown in an elevated position by dotted lines;

Figure 4 is an enlarged fragmentary vertical sectional view taken substantially upon the plane indicated by the section line 4—4 of Figure 3 and shows the details of the pivotal connection between the tonneau portion of the vehicle conversion unit and a flower well, a central portion of the vehicle conversion unit being broken away;

Figure 5 is an enlarged fragmentary top plan view of one of the hinge connections between the tonneau portion and the flower well;

Figure 6 is an enlarged fragmentary perspective view of the forward part of the tonneau portion and shows the general details of a hinge fitting; and Figure 7 is an enlarged fragmentary vertical sectional view taken substantially upon the plane indicated by the section line 7—7 of Figure 2 and shows the details of the connection between the tonneau portion and the trunk lid.

Referring now to the drawings in detail, it will be seen that there is illustrated a conventional convertible type passenger vehicle which is referred to in general by the reference numeral 10. The passenger vehicle 10 includes a body which is referred to in general by the reference numeral 12. Among other features, the body 12 includes a windshield 14, a front seat 16, a rear seat 18 and a trunk lid 20. As is best illustrated in Figure 1, the trunk lid 20 is mounted in a rear deck 22 of the body 12.

Mounted on the vehicle 10 is the vehicle conversion unit, which is the subject of this invention, the vehicle conversion unit being referred to in general by the reference numeral 24. The vehicle conversion unit 24 includes a cab 26 which is positioned over the front seat 16 and connected to the windshield 14 through the use of conventional fittings of the type utilized to normally secure the convertible top (not shown) of the vehicle 10 to the windshield 14.

Connected to the cab 26 and disposed rearwardly thereof is a flower well 28. The flower well 28 seats on the rear seat 18 and has a horizontal shallow portion 30 which extends up over the seat 18 across the upper portion of the trunk deck 22. The shallow well 30 terminates in a downwardly directed flange 32 which is intended to rest upon the trunk deck 22 and support the flower well portion of the vehicle conversion unit.

Pivotally connected to the rear part of the flower well 28 is a tonneau portion 34. The tonneau portion 34 also includes a flower well 36 and is actually a simulated tonneau. The tonneau portion 34 includes a rear flange 38 which has a cushion strip 40 along the lower edge engaging the lower rear surface of the trunk lid 20. As is best illustrated in Figure 1, the tonneau portion 34 also includes depending side flanges 42 which have lower cushioning strips 44 which rest against the trunk lid 20 adjacent opposite edges thereof.

The tonneau portion 34 is pivotally connected to the shallow well 30 by hinges which are referred to in general by the reference numeral 46. The hinges 46 are transversely aligned so that the tonneau portion 34 may pivot about a transverse axis. Each of the hinges 46, as is best illustrated in Figure 4, includes a hinge bolt 48 which is secured to a side rib portion 50 of the tonneau portion 34 by a mounting plate 52. The hinge bolt 48 passes through an upwardly directed plate 54 carried by the rear part of the shallow well portion. Disposed between the plate 54 and the side rib portion 50 is a spacing washer 56. A similar washer 58 is disposed between the plate 54 and a locking nut 60 carried by the hinge bolt 48.

Securing the side flanges 42 to the trunk lid 20 are connectors which are referred to in general by the reference numeral 62. There is one connector 62 adjacent the rear edge of each of the side flanges 42.

As is best illustrated in Figure 7, each of the connectors 62 includes a member 64 having a hook-shaped lower end 66 engaged over an outwardly directed side flange 68 of the trunk lid 20. Carried by an associated side flange 42 is a fastener 70 having a locking nut 72. The fastener 70 passes through a vertical slot 74 in the upper portion of the member 64 to permit vertical adjustment as well as vertical movement between the side flange 42 and the trunk lid 20.

In normal use of the vehicle conversion unit 24, the hinge bolts 48 and their associated nuts 60 rigidly lock the tonneau portion 34 to the shallow well portion 30 to form a rigid body unit. The forward part of the body unit is secured to the windshield 14 and the rear part of the body unit is secured to the trunk deck 20 by the connectors 62. It is to be understood that although it has not been specifically shown in this application, all portions of the vehicle conversion unit 20 in engagement with the body 12 will have suitable cushioning strips disposed therebetween.

When it is desired to utilize the trunk of the body 12, it is merely necessary to loosen the locking nut 72 and the locking nuts 60 and then lift the tonneau portion 34 so that it pivots about the hinge bolts 48. After the tonneau portion 34 has been moved to its position of Figure 1, it may be locked in place either by use of the nuts 60 or by the use of suitable chains (not shown) extending between the tonneau portion 34 and the flower well 28. The trunk lid 20 may then be opened in the normal manner.

It is to be understood that the vehicle conversion unit 24 will be formed of a light weight material, such as fiber glass or the like, and that all portions thereof will blend together to form a body which blends with the body 12 and is very neat in appearance. Also, all metal fittings may be formed of stainless steel or other similar metals.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A vehicle conversion unit for converting a convertible type passenger vehicle to a flower carrier, said vehicle conversion unit being in the form of an upper body having a forward cab portion, an intermediate flower well, and a rear tonneau portion, said rear tonneau portion being adapted to overlie a vehicle trunk in its normal body forming position and having connectors of the hold down type at opposite sides thereof releasably and slidably engageable with side flanges of a trunk lid, said tonneau portion being pivotally connected to said flower well for pivoting about an axis transverse of said body, said axis being intended to be positioned forwardly of the vehicle trunk, whereby the vehicle trunk lid may be raised when said vehicle conversion unit is in position.

2. A vehicle conversion unit for converting a convertible type passenger vehicle to a flower carrier, said vehicle conversion unit being in the form of an upper body having a forward cab portion, an intermediate flower well, and a rear tonneau portion, said rear tonneau portion being adapted to overlie a vehicle trunk in its normal body forming position and having connectors at opposite sides thereof releasably and slidably engageable with side flanges of a trunk lid, said tonneau portion being pivotally connected to said flower well for pivoting about an axis transverse of said body, said axis being intended to be positioned forwardly of the vehicle trunk, whereby the vehicle trunk lid may be raised when said vehicle conversion unit is in position, means locking said tonneau portion relative to said flower well to form said body into a rigid unit.

3. A vehicle conversion unit for converting a convertible type passenger vehicle to a flower carrier, said vehicle conversion unit being in the form of an upper body having a forward cab portion, an intermediate flower well, and a rear tonneau portion, said rear tonneau portion being adapted to overlie a vehicle trunk in its normal body forming position and having connectors at opposite sides thereof engageable with side flanges of a trunk lid, said tonneau portion being pivotally connected to said flower well for pivoting about an axis transverse of said body, said axis being intended to be positioned forwardly of the vehicle trunk, whereby the vehicle trunk lid may be raised when said vehicle conversion unit is in position, said connectors being releasable and slidable relative to the vehicle trunk to permit separate pivoting of said tonneau portion and the trunk lid.

4. A vehicle conversion unit for converting a convertible type passenger vehicle to a flower carrier, said vehicle conversion unit being in the form of an upper body having a forward cab portion, an intermediate flower well, and a rear tonneau portion, said rear tonneau portion being adapted to overlie a vehicle trunk in its normal body forming position and having connectors at opposite sides thereof engageable with side flanges of a trunk lid, said tonneau portion being pivotally connected to said flower well for pivoting about an axis transverse of said body, said axis being intended to be positioned forwardly of the vehicle trunk, whereby the vehicle trunk lid may be raised when said vehicle conversion unit is in position, said connectors being releasable and slidable relative to the vehicle trunk to permit separate pivoting of said tonneau portion and the trunk lid, each of said connectors including a member having a hook-shaped end engageable over the trunk lid side flange, a fixed fastener carried by a side of said tonneau portion, said member being adjustably carried by said fastener.

5. A vehicle conversion unit for converting a convertible type passenger vehicle to a flower carrier, said vehicle conversion unit being in the form of an upper body having a forward cab portion, an intermediate flower well, and a rear tonneau portion, said rear tonneau portion being adapted to overlie a vehicle trunk in its normal body forming position and having connectors at opposite sides thereof releasably and slidably engageable with side flanges of a trunk lid, each of said connectors including a member having a hook-shaped end engageable over a trunk lid side flange, a fixed fastener carried by a side of said tonneau portion, said member being adjustably carried by said fastener, said tonneau portion being pivotally connected to said flower well for pivoting about an axis transverse of said body, said axis being intended to be positioned forwardly of the vehicle trunk, whereby the vehicle trunk lid may be raised when said vehicle conversion unit is in position, means locking said tonneau portion relative to said flower well to form said body into a rigid unit.

References Cited in the file of this patent

UNITED STATES PATENTS

| 1,379,906 | Ellerbeck | May 31, 1921 |
| 1,420,298 | White | June 20, 1922 |
| 2,566,303 | Allmond | Sept. 4, 1951 |
| 2,657,087 | Morris | Oct. 27, 1953 |

FOREIGN PATENTS

| 677,110 | France | Dec. 7, 1929 |
| 976,846 | France | Nov. 1, 1950 |
| 664,409 | Great Britain | Jan. 9, 1952 |